United States Patent
Rziha

(10) Patent No.: US 8,258,794 B2
(45) Date of Patent: Sep. 4, 2012

(54) MEASURING DEVICE FOR PURITY MEASUREMENTS IN A MEDIA CIRCUIT OF A POWER STATION AND METHOD FOR OPERATING SAID MEASURING DEVICE

(75) Inventor: Michael Rziha, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 475 days.

(21) Appl. No.: 12/308,499

(22) PCT Filed: Jun. 1, 2007

(86) PCT No.: PCT/EP2007/055380
§ 371 (c)(1),
(2), (4) Date: Dec. 16, 2008

(87) PCT Pub. No.: WO2008/000580
PCT Pub. Date: Jan. 3, 2008

(65) Prior Publication Data
US 2011/0181291 A1    Jul. 28, 2011

(30) Foreign Application Priority Data
Jun. 28, 2006  (EP) .................................... 06013354

(51) Int. Cl.
*G01N 27/62*    (2006.01)
(52) U.S. Cl. ........ 324/466; 324/438; 324/464; 376/306; 376/305
(58) Field of Classification Search .................. 210/660, 210/638; 204/632; 324/459, 466
See application file for complete search history.

(56) References Cited

U.S. PATENT DOCUMENTS

| | | | | |
|---|---|---|---|---|
| 3,862,032 A * | 1/1975 | Dixson et al. | ................. | 210/675 |
| 4,699,755 A * | 10/1987 | Dagard et al. | ................. | 376/313 |
| 4,940,564 A * | 7/1990 | Aizawa et al. | ................. | 376/306 |
| 5,398,269 A * | 3/1995 | Nagase et al. | ................. | 376/306 |
| 5,558,753 A * | 9/1996 | Gallagher et al. | ............ | 204/632 |
| 5,788,828 A * | 8/1998 | Nakatsu et al. | ............... | 204/632 |
| 5,892,805 A * | 4/1999 | Yamane et al. | ................ | 376/306 |
| 5,906,178 A * | 5/1999 | Liebig et al. | ............... | 122/451 S |
| 6,856,665 B2 * | 2/2005 | Hemmi et al. | ................. | 376/306 |
| 6,968,028 B1 * | 11/2005 | Puthawala | ..................... | 376/306 |
| 7,442,454 B2 * | 10/2008 | Wakabayashi | ................ | 429/438 |

(Continued)

FOREIGN PATENT DOCUMENTS

CH    483 612    12/1969

(Continued)

OTHER PUBLICATIONS

Bettenworth et al., "On-line Monitoring of Corrosive Tendencies of Cycle Fluid, Measurements of the Concentration of Suspended Ferric/Ferrous Oxides/Hydroxides by Use of Turbidity", VCB PowerTech, Sep. 2004, pp. 31-37., XP-001201632.

(Continued)

*Primary Examiner* — Richard Isla Rodas

(57) ABSTRACT

A measuring device for carrying out purity measurements in a media circuit of a power station with an ion exchanger device and a measuring means for measuring a parameter of a media current flowing through the ion exchanger device is described. In order to obtain measurements in a rapid and reliable manner at the start up of the ion exchanger device, for example during the start-up phase of the power station, it is suggested that the ion exchanger device has two flow paths for two different operating modes of the power station.

7 Claims, 1 Drawing Sheet

U.S. PATENT DOCUMENTS

| | | | |
|---|---|---|---|
| 2003/0180186 A1* | 9/2003 | Carson et al. | 422/82.02 |
| 2004/0028963 A1* | 2/2004 | Kormann et al. | 429/13 |
| 2005/0103622 A1* | 5/2005 | Jha et al. | 204/237 |
| 2008/0250769 A1* | 10/2008 | Wagner et al. | 60/39.24 |

FOREIGN PATENT DOCUMENTS

| | | | |
|---|---|---|---|
| JP | 58170807 A | 10/1983 | |
| WO | WO 88/03633 | 5/1988 | |

OTHER PUBLICATIONS

Germann, "Automatisierte Analytik im Wasser-Dampf-Kreislauf", VGB PowerTech, Sep. 2004, pp. 46-48, XP-001201633.

* cited by examiner

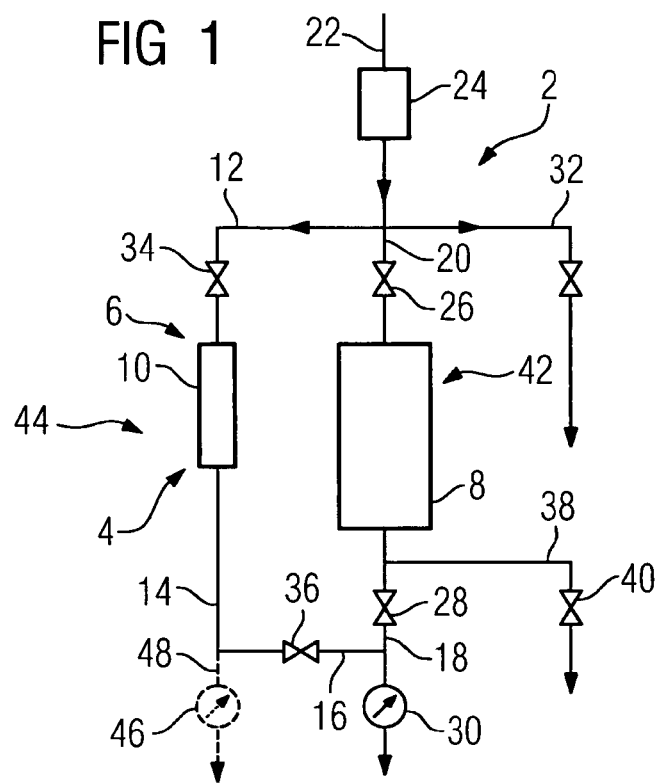
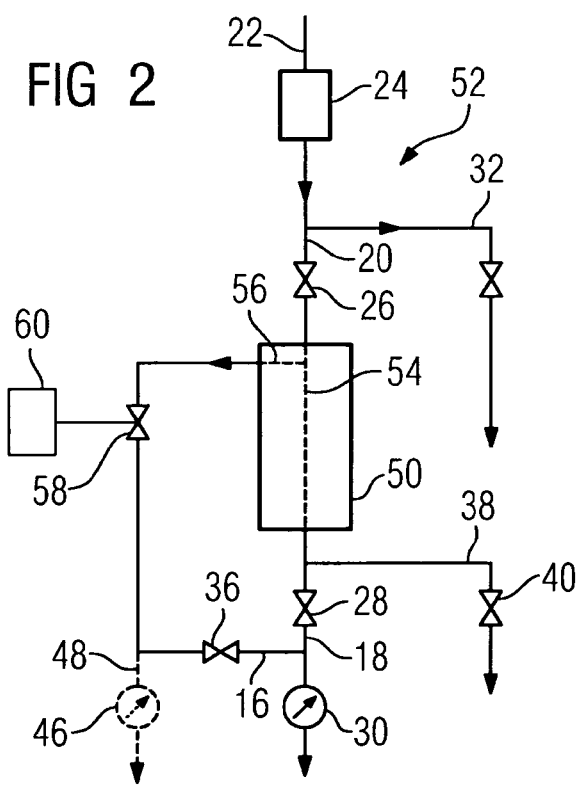

MEASURING DEVICE FOR PURITY MEASUREMENTS IN A MEDIA CIRCUIT OF A POWER STATION AND METHOD FOR OPERATING SAID MEASURING DEVICE

CROSS REFERENCE TO RELATED APPLICATIONS

This application is the U.S. National Stage of International Application No. PCT/EP2007/055380 filed Jun. 1, 2007, and claims the benefit thereof. The International Application claims the benefits of European application No. 06013354.3 EP filed Jun. 28, 2006, both applications are incorporated by reference herein in their entirety.

FIELD OF INVENTION

The invention relates to a measuring device for carrying out purity measurements in a media circuit of a power station, comprising an ion exchanger device and a measuring means for measuring a parameter of a media current flowing through the ion exchanger device. The invention also relates to a method for operating said measuring device.

BACKGROUND OF INVENTION

In the steam circuits of power stations, water is evaporated and fed under high pressure to a turbine, where the steam expands and cools. The high purity of the water or steam in such a circuit is extremely important, since impurities such as NaCl, $CaCO_3$, $MgCO_3$ etc. largely remain behind as deposits when the water is evaporated, thereby causing damage to the evaporator. Other compounds such as silicates, as well as the smallest quantities of the impurities mentioned above, are entrained in the steam phase and can precipitate onto turbine blades when the steam cools, leading to the possibility of corrosion and fouling in the turbine.

It is known that purity measurements are carried out on the water circuits of power stations, for example to measure the cation conductivity of the water, which is a measure of the purity of the water or steam in the water circuit. In this connection the alkalizing medium added to the water circuit in order to neutralize damaging acids is extracted with the aid of a strongly acidic cation exchanger and cations are exchanged. For example the $Na^+$ from NaCl is extracted from the water and $H^+$ is added to the water in its place, resulting in HCl which has three times greater conductivity than NaCl. The conductivity of the water is therefore measured downstream and in some cases also upstream of the cation exchanger, and a conclusion is then reached about the water purity.

SUMMARY OF INVENTION

During the startup phase of a power station or turbine, the purity measurement plays a major role, since its results are decisive in whether steam can be fed to the turbine or whether the water needs to be purified further.

An object of the invention is therefore to specify a measuring device for measuring the purity of a media circuit in a power station and a method for operating said measuring device, in Order that a power generation unit such as a turbine or a power station can be rapidly brought into operation.

The first mentioned object is achieved by a measuring device of the type mentioned in the introduction, where inventively the ion exchanger device has two flow paths for two different power station operating modes.

In this case the invention is based on the notion that power stations are operated in a much more variable manner nowadays, being more frequently shut down and started up again than they once were. It is therefore increasingly important to have only a short startup phase and to be able to obtain reliable values for purity measurement in a shorter time. When the circuit has been shut down, the water in an ion exchanger is unsuitable for measurements, because when the water is at a standstill an ion exchanger releases the ions that it traps in normal operation back into the water. The ion exchanger must therefore first be flushed for a while before reliable measurements can be expected. Trials have shown that it must be flushed with around three times its own volume in water. Since the service life of an ion exchanger increases with its volume it needs to have a certain volume for the sake of efficient operation, and is therefore committed to a long flushing time. Due to these mutually conflicting conditions there has to be a comparatively long waiting time before reliable measurements can be obtained after the ion exchanger device has been started up. These mutually conflicting conditions can be overcome by choosing to flush the ion exchanger at a high flow rate at the beginning of a startup phase. However, this prevents the buildup of a reaction equilibrium in the ion exchanger, so that although a correct measurement is obtained sooner, it is still not soon enough. Moreover setting up a special flow rate for flushing makes controlling the measuring device a very complex operation.

By using two flow paths for two different operating modes of the power station or ion exchanger device, the flow paths can be adapted to the operating modes thereby enabling mutually conflicting conditions to be distributed between both flow paths. An ion exchanger can have a long service life and reliable measurements can be rapidly obtained.

The media circuit can be a water circuit, and this can include the vaporous state of aggregation of the water. Purity measurements can be obtained by purity monitoring. The flow paths advantageously both run through at least one ion exchanger of the ion exchanger device. The measuring means can be a conductivity sensor for measuring the conductivity of the medium, in particular of the water or steam. The measuring device can include analysis means, such as electronic analysis means, which however need not necessarily be present or can be separate from the measuring device. The ion exchanger device advantageously includes a cation exchanger. The power station can be one or more turbines connected to a media circuit, or can be a complete power station such as a gas and steam plant, or simply a part of such a plant.

In an advantageous embodiment of the invention one of the flow paths is provided for starting up the ion exchanger device. Reliable measurements can be rapidly obtained. For this purpose the percolation volume of this flow path is advantageously smaller than that of the other flow path. The startup after a shutdown can be an operating mode, in particular of the power station, such as part of a starting mode of the power station.

Advantageously the two flow paths include a dedicated ion exchanger, in particular a cation exchanger. The ion exchangers can each be adapted to the respective operating mode and individually swapped out. In another advantageous embodiment, both flow paths run through a single ion exchanger which has two different and in particular parallel flow paths, at least one of which can be operated separately from the other one. The number of parts to be maintained can be reduced.

It is also recommended that one of the ion exchangers be provided for a startup operation and/or operational startup and have a smaller percolation volume than the other ion exchanger. Rapid flushing and therefore rapid system readiness can be achieved.

A further embodiment of the invention is characterized in that the flow paths are arranged in parallel. This enables not only independent operation of the two flow paths for the purpose of conserving resources, but also for example a short term operation in order to achieve trouble-free measurement transfer. In particular both of the ion exchangers are arranged in parallel to both of the flow paths.

Efficient use can be made of the measuring means and a cost-effective measuring device can be achieved if both flow paths are connected individually to the measuring means, it being possible in each case for the other flow path to be separable from said measuring means. It is possible for one measuring means to be used for both flow paths independently of each other.

If both flow paths have a measuring means for measuring the parameter, the values returned by each of the measuring means can be compared, and it will be possible to switch rapidly between the flow paths. Advantageously a dedicated measuring means for measuring the parameter is allocated to each ion exchanger, and in particular said measuring means is arranged downstream of the ion exchanger concerned.

The measuring device can be operated in a simple manner by means of a manual control, for example by an operator switching manually between the flow paths, manually actuating valves or manually reading out the measuring means. A control unit for activating one of the flow paths during the startup phase of the power station can ensure that the startup is efficient. Furthermore a control-unit enabled switchover between the flow paths, for example by means of an automatic measurement readout, can ensure a short startup operation and thereby prevent damage to an ion exchanger provided for startup operations.

The method-focused object is achieved by a method of the type mentioned in the introduction, in which inventively a first flow path of the ion exchanger device is activated when the ion exchanger device is started up, and operated in order to perform a purity measurement, but is locked when the first flow path is subsequently operated in the normal manner and a measurement is taken by means of a second flow path. By operating the two flow paths for two different operating modes of the power station or ion exchanger device in different ways, the flow paths can be adapted to the operating modes thereby enabling mutually conflicting conditions to be distributed between both flow paths. An ion exchanger can have a long service life and reliable measurements can be obtained rapidly. A startup can take place after a shutdown and can cover at least a period of time until the ion exchanger reaches an equilibrium for operation in the normal manner.

It is possible to perform a low-noise and rapid switch between the flow paths if purity measurements are taken via both flow paths when the ion exchanger device is started up.

BRIEF DESCRIPTION OF THE DRAWINGS

The invention will be explained in greater detail with the aid of exemplary embodiments shown in the drawings.

These show the following:

FIG. 1 A measuring device having two cation exchangers in a sampling system of a water circuit in a power station and FIG. 2 A further measuring device having a cation exchanger comprising two parallel flow paths.

DETAILED DESCRIPTION OF INVENTION

FIG. 1 shows a diagram of a section from a sampling system 2 of a water circuit on a steam turbine (not shown) in a power station, having a measuring device 4. The measuring device 4 comprises an ion exchanger device 6 with two different sized ion exchangers 8, 10, designed in the form of cation exchangers and interconnected via a plurality of lines 12, 14, 16, 18, 20.

During a normal operation of the steam turbine a volume of 60 l/h of very pure, alkalized water in the form of steam is extracted from the remaining water circuit and fed to the sampling system 2 via a sampling line 22. The steam is condensed in a sampling cooler 24. From the 60 l/h of water, 10 l/h of water are routed via an open valve 26 to the large 1.5 l size ion exchanger 8. There the alkalization of the water is neutralized and cations of for example salts are exchanged for $H^+$ ions. The water modified in this way is routed via the line 18 through an open valve 28 to a measuring means 30 designed in the form of a conductivity measuring device, which measures and displays the conductivity of the water. The water purity can be determined from the conductivity. The remaining 50 l/h are routed via a line 32 to other test areas in the sampling system such as manual sampling, from where the water is extracted and analyzed.

When the turbine is shut down, the water that is left in the ion exchanger 8 stays there until the turbine is started up again and the 60 l/h flow has restarted. In order to obtain stable measurements, the volume of 1.5 l in the ion exchanger 8 must be changed about three times, which would take around 26 min at a flow of 10 l/h. Only then is it possible to obtain stable measurements from the measuring means 30 so that a decision can be taken as to whether the water is pure enough to be fed as steam to the turbine. To get around this long waiting time, the measuring device 4 includes the small ion exchanger 10, which holds a volume of 150 ml.

During the startup phase of the power station or turbine, a current of 10 l/h of water is directed via the line 12 and an open valve 34 to the ion exchanger 10, which in this way is sufficiently flushed in around 3 min. The water is sent via the line 14 and an open valve 36 to the measuring means 30 where purity measurements are performed. The valve 28 is closed at this point. In parallel with this initially short flushing and measuring operation, a current of 10 l/h of water is routed through the ion exchanger 8, which is flushed in this way so as to be ready for use in 26 min. The water from the ion exchanger 8 is fed into a rejection line 38 and discharged via an open valve 40. When the ion exchanger 8 is ready for use, the valves 34, 36, 40 are closed and the valve 28 is opened so that the purity measurement becomes self-sustainable via a flow path 42 via the large ion exchanger 8 and a flow path 44 via the small ion exchanger 10 can be closed. The measuring means 30 now receives the sample water from the ion exchanger 8 via flow path 42, said flow path being by now in equilibrium condition; and since there is no change in the current through the ion exchanger 8 due to the operation of the valves 34, 36, 40, the equilibrium remains stable and reliable measurement results can be obtained straight away.

In an enhanced embodiment the measuring device 4 includes a second measuring means 46 that is connected to the ion exchanger 10 via an additional line 48. In this way the sample water from the ion exchanger 10 can be directed to the measuring means 46 during the startup phase of the turbine, the valve 36 being closed. In parallel with this, the sample water is directed out of the ion exchanger 8 to the measuring means 30 when the valve 28 is open, so that both the measuring means 30, 46 can be read off in parallel. In this way it is possible to rapidly detect when a meaningful equilibrium condition has been reached after the ion exchanger 8 has been flushed, in particular when the measurements from both the measuring means 30, 46 have equalized.

At a flow rate of 10 l/h the service life of the small ion exchanger 10 amounts to some 3-4 h, which is suitable for a few startup processes. After that it must be swapped out. At the same flow rate the large ion exchanger 8 has a service life of 3-4 weeks and must then be swapped out. If not too many startup processes are run during this 3-4 week period, replacement of the ion exchangers 8, 10 can be simplified by a common cation exchanger 50, shown in FIG. 2.

FIG. 2 shows a measuring device 52 which has the cation exchanger 50. The description which follows is confined largely to the differences in respect of the exemplary embodiment from FIG. 1, to which reference should be made concerning features and functions which stay the same. In the main, components that are the same have been assigned the same reference numbers. The cation exchanger 50 has two flow paths 54, 56, the flow path 54 being for normal operation and the flow path 56 for the power station startup phase. The flow path 56 runs through only around 300 ml of the forward part of the cation exchanger 50 and as a result this part is rapidly flushed, as in the case of the ion exchanger 10. During a startup phase a valve 58 can be opened enabling 10 l/h to flow through the flow path 56, and an additional 10 l/h through the flow path 54. The 300 ml sized forward part of the cation exchanger is used by both flow paths, making in fact 20 l/h, so that this part is likewise rapidly flushed, as in the case of the ion exchanger 10. In normal operation the valve 58 is closed. The valve 58 can be driven with the aid of a control unit 60, as can the further valves 36, 28 and 40 if necessary. In this way the control unit can enable a switchover between the flow paths 54, 56, for example by means of an automatic measurement readout from the measuring means 30, 46. This enables a startup to be kept short and the ion exchanger 10 or the forward part of the cation exchanger 50 provided for a startup can be protected from damage. A manual operating mode is an alternative possibility.

The invention claimed is:

1. A measuring device for carrying out purity measurements in a water circuit in a steam turbine in a power station, the steam turbine having at least first and second different operating modes, comprising:
    an ion exchanger device having first and second selectable flow paths for movement of steam turbine water through the steam turbine water circuit during operation of the steam turbine and first and second ion exchangers, which each removes the same alkalizing medium with an acidic cation exchanger through identical ion exchanging processes, which effects removal of impurities of a type that cause damage to an evaporator or turbine blades, the first ion exchanger positioned in the first flow path and the second ion exchanger positioned in the second flow path, the first ion exchanger being smaller than the second ion exchanger so that water can be flushed through the first ion exchanger in a relatively short period of time during turbine startup, compared to the amount of time required to flush water through the second ion exchanger during normal operation of the steam turbine, the measuring device including one or more first valves for selecting movement of the steam turbine water through the first flow path during start-up in the first operating mode of the steam turbine and one or more second valves for selecting movement of the steam turbine water through the second flow path during normal operation in the second operating mode of the steam turbine, wherein the first operating mode is a startup mode of the steam turbine; and
    at least one measuring unit for alternately measuring a parameter of the steam turbine water flowing through the first and second ion exchangers of the ion exchanger device, the device enabling measurement of conductivity from a relatively small volume filter during startup in the first operating mode and measurement of conductivity from a relatively large volume filter during normal operation in the second operating mode.

2. The measuring device as claimed in claim 1, wherein the first ion exchanger has a smaller percolation volume than the other ion exchanger.

3. The measuring device as claimed in claim 1, wherein the first and second flow paths are arranged in parallel.

4. The measuring device as claimed in claim 1, wherein each flow path is connectable individually to the measuring unit.

5. The measuring device as claimed in claim 1, further comprising:
    a control unit for activating one of the flow paths during the startup mode of the steam turbine.

6. A method for operating a measuring device for carrying out purity measurements in a water circuit in a steam turbine in a power station, with an ion exchanger device and at least one measuring unit for measuring a parameter of a water current flowing through the ion exchanger device, comprising:
    providing first and second different flow paths, each including an ion exchanger which removes the same alkalizing medium with an acidic cation exchanger through identical ion exchanging processes, to effect removal of impurities, the first flow path providing movement of steam turbine water through the water circuit during startup of the turbine and the second flow path providing movement of steam turbine water through the water circuit during normal operation of the steam turbine, wherein the first ion exchanger is smaller than the second ion exchanger so that water can be flushed through the first ion exchanger in a relatively short period of time during turbine startup, compared to the amount of time required to flush water through the second ion exchanger during normal operation of the steam turbine;
    activating the first flow path of the ion exchanger device when said ion exchanger device is started up during startup of the steam turbine;
    carrying out a first purity measurement with the measuring unit on water flowing through the first flow path during startup of the steam turbine; and
    carrying out a second purity measurement on water flowing through the second flow path during normal operation of the steam turbine so that alternate measurement of conductivity of the steam turbine water is provided based on flow of the steam turbine water through only the ion exchanger of the first path during startup of the turbine and flow through at least the ion exchanger of the second path during normal operation of the turbine, thereby enabling measurement of conductivity from a relatively small volume filter during startup of the turbine and measurement of conductivity from a relatively large volume filter during normal operation of the turbine.

7. The method as claimed in claim 6, wherein purity measurements are taken via both flow paths during normal operation and the second purity measurement is carried out with the same measuring unit used to carry out the first purity measurement.

* * * * *